US006639695B1

United States Patent
Ogata

(10) Patent No.: US 6,639,695 B1
(45) Date of Patent: Oct. 28, 2003

(54) IMAGE READING DEVICE

(75) Inventor: Kazutsugu Ogata, Saitama (JP)

(73) Assignee: Fuji Photo Optical Co., Ltd., Omiya (JP)

( * ) Notice: Subject to any disclaimer, the term of this patent is extended or adjusted under 35 U.S.C. 154(b) by 0 days.

(21) Appl. No.: 09/407,859

(22) Filed: Sep. 29, 1999

(30) Foreign Application Priority Data

Oct. 2, 1998 (JP) .......................................... 10-281439

(51) Int. Cl.[7] ................................................ H04N 1/04
(52) U.S. Cl. ...................................... 358/474; 358/497
(58) Field of Search ................................. 358/497, 474

(56) References Cited

U.S. PATENT DOCUMENTS 3,824,546 A * 7/1974 Kawasaki et al. ............ 355/84
5,103,091 A * 4/1992 Hirose et al. ............... 358/471
5,949,922 A * 9/1999 Wada et al. ................ 358/471

* cited by examiner

Primary Examiner—Edward Coles
Assistant Examiner—Heather D Gibbs
(74) Attorney, Agent, or Firm—Leydig, Voit & Mayer, Ltd.

(57) ABSTRACT

In an image reading device, light from a source document is formed in an image by an optical image-forming system including a lens and the formed image is detected by a charged coupled device (CCD) sensor. A reading line of the image read by the optical system and the CCD sensor is scanned in a vertical scanning direction. The charge accumulated in the CCD sensor is read out through a timing circuit and an analog-to-digital converter. Light from an extension of a reading line of a position-reading pattern in or on a position-reading plate is also formed into an image and detected by the CCD sensor, based on which, misregistration of a scanning position in the vertical scanning direction is detected. The image data read out by the CCD sensor is corrected by a correction circuit, based on the misregistration of a scanning position in the vertical scanning direction.

1 Claim, 7 Drawing Sheets

Fig.5

| OUTPUT OF COMPARATOR 161 (DENSITY GRADIENT) | OUTPUT OF COMPARATOR 130 (MISREGISTRATION) | OUTPUT OF EXCLUSIVE OR CKT 162 | OUTPUT OF INVERTER CKT 164 (CORRECTION VALUE) |
|---|---|---|---|
| − | − | − | −α |
| + | + | − | −α |
| − | + | + | +α |
| + | − | + | +α |
| 0 |  | 0 | 0 |
|  | 0 | 0 | 0 |

IMAGE READING DEVICE

BACKGROUND OF THE INVENTION

1. Field of the Invention

The present invention relates to an image reading device favorably applicable to digital copiers.

2. Related Background Art

Generally, a digital copier includes an image reading device for reading an image depicted on a source document, an image processing circuit for processing, as needed, the image data read by the image reading device, and an output part for printing out the processed image. In order to read the two-dimensional image depicted on the source document, the image reading device includes an optical image-forming system accepting light from the source document and forming an image from the accepted light, a CCD sensor having a number of photoreceptors or pixels arranged in a horizontal scanning direction to detect light of the image formed by the optical image-forming system, and a scanner for scanning a reading-line position, read by the CCD sensor, on the source document in a vertical scanning direction. The scanner in the image reading device generally includes a pulse motor as a driving source, and a transmission mechanism (e.g., geared pulleys, and a timing belt) for transmitting the rotation of the pulse motor. A carriage or carrier included in the optical image-forming system is driven in the vertical scanning direction.

However, with such a scanner of the image reading device, the scanning of the reading line position in the vertical scanning direction by the CCD sensor involves microscopic misregistration of scanning speed due to a step-motion of the pulse motor and the mechanical engagement between the geared pulleys and the timing belt. Therefore, the image obtained by the image reading device is not an image faithfully copied the image depicted on the source document. With a view toward solving the above drawbacks, it is conceived that the scanning of the carriage can be flattened by applying an inertial force on the rotary axle of the pulse motor or by increasing an inertia of the carriage resulting from combining the carriage and magnet.

SUMMARY OF THE INVENTION

However, as the misregistration in scanning speed of the carriage in the vertical scanning direction tends to cause vibrations, a resonance phenomenon may occur at a certain scanning speed. Furthermore, a scanning speed of the carriage is set in accordance with a scaling factor of duplication (a ratio of image size on the document to image size printed out by the output part). It can be understood that the resonance phenomenon occurs at a certain scaling factor of duplication. Where the inertial force is applied on the rotary axle of the pulse motor and the inertia of the carriage is increased as mentioned above, it is possible merely to shift a scaling factor of duplication at which the resonance phenomenon occurs. Thus, the resonance phenomenon may still be encountered at a certain scaling factor of duplication or at a certain scanning speed. If such a resonance phenomenon occurs, quality of an image read by the image reading device will be degraded.

The present invention has been made in order to overcome the above drawbacks and has for its object to provide an image reading device capable of reading an image and outputting high-grade image data.

According to the present invention, an image reading device comprises: (1) a first optical image-forming system receiving light from an image on a readout surface and forming an image of the received light on an image-forming plane; (2) a CCD sensor arranged in the image-forming plane in parallel to a horizontal scanning direction to detect light of the image formed by said first optical image-forming system, said CCD sensor accumulating, in each pixel thereof, a charge in response to the amount of detected light; (3) means for scanning, in a vertical scanning direction perpendicular to the horizontal direction, a reading line of the image on the readout surface by said optical image-forming system and said CCD sensor; (4) means for reading out, as image data, the charge accumulated in each pixel of said CCD sensor; (5) means for detecting a scanning position of the scanning means; and (6) means for correcting the image data read out by said readout means based on the scanning position detected by said scanning-position detecting means.

According to this image reading device, the light from the image on the document to be read is focused through the optical image-forming system and detected by the CCD sensor. The image-reading line by the CCD sensor and the optical image-forming system is scanned in the vertical scanning direction by the scanning means and the charge accumulated in the CCD sensor is read by the readout means. The scanning position by the scanning means is detected by the scanning-position detecting means and the image data read by the readout means is corrected by the correcting means based on the scanning position detected by the scanning-position detecting means.

Preferably, the scan position detecting means of the image reading device according to the invention comprises: (1) a position-reading plate having a position-reading pattern depicted adjacent to said readout surface over a range of scanning by said scanning means; (2) a second optical image-forming system for use in position-reading, said second optical system receiving light from a portion of said position-reading pattern on an extension of the reading line scanned by said scanning means and forming an image thereof; and (3) means for detecting an amount of light of the image formed by said second optical image-forming system, said detecting means determining the scanning position scanned by said scanning means based on the detected amount of light. In this preferred arrangement, the light from a portion of the position-reading pattern on an extension of the reading line scanned by the scanning means is received by the second optical image-forming system. The detecting means detects an amount of light of the image formed by the second optical image-forming system, and the detecting means determines the scanning position scanned by the scanning means based on the detected amount of light.

The first and second optical image-forming systems may share a common configuration, and the detecting means may use pixels of the CCD sensor other than those used to detect the light of the image formed by the first optical image-forming system. In this case, as the CCD sensor and the first optical image-forming system for reading the image depicted on the source document is employed as the scanning-position detecting means, there is no need to provide an additional optical system. This prevents an image reader from being upsized.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 5 is a list explaining operations of an exclusive OR circuit and inverter circuit in the correction circuit of the image reading device according to the preferred embodiment;

DESCRIPTION OF THE PREFERRED EMBODIMENTS

Figure 1:
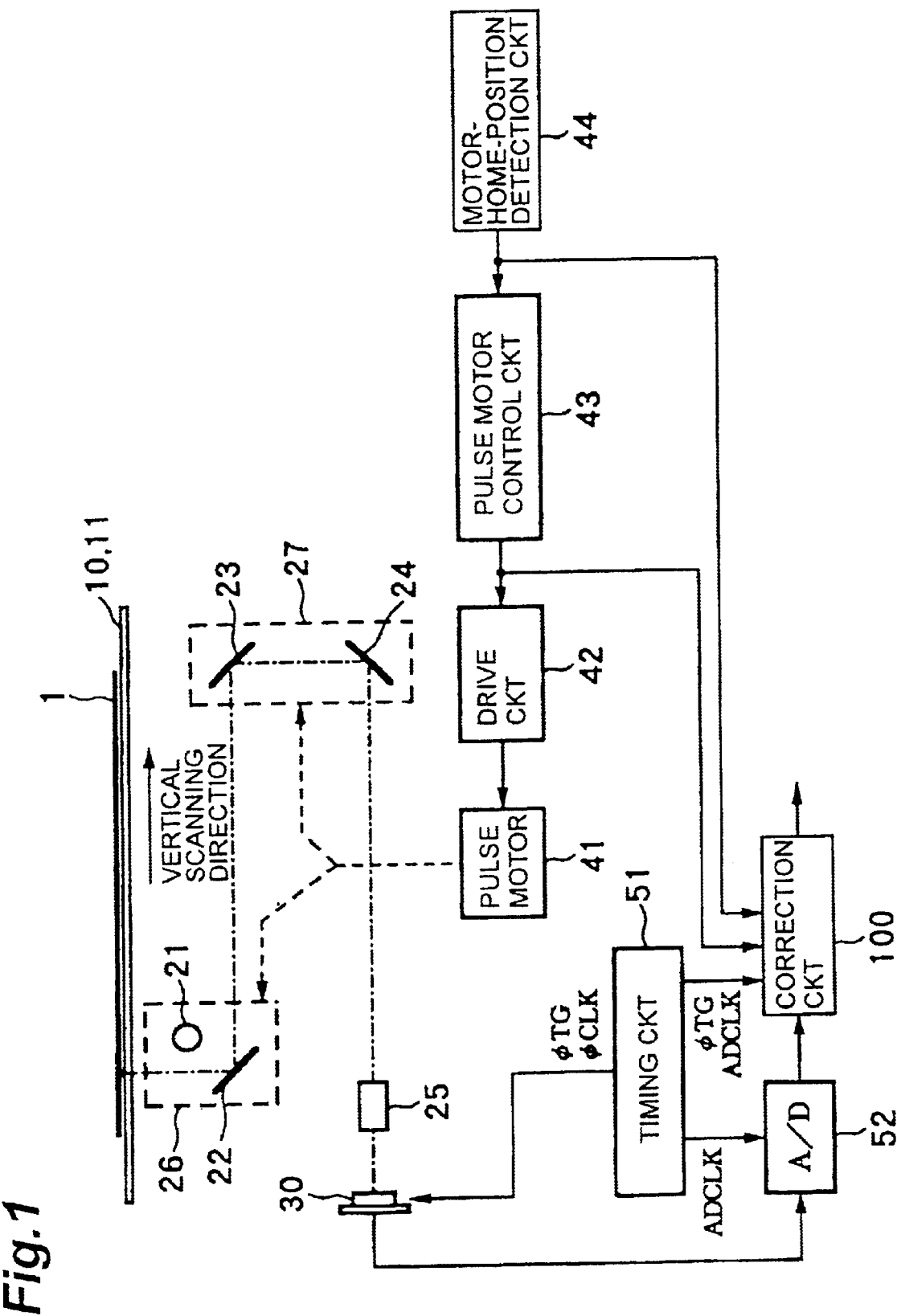
FIG. 1 is a view showing a configuration of an image reading device according to the preferred embodiment of the present invention.

Hereinafter, the preferred embodiments of the present invention will be explained in detail with reference to the accompanying drawings, wherein the same or similar reference numerals represent the same elements to avoid duplication of explanation.

FIG. 1 shows a configuration of an image reading device in accordance with one embodiment of the present invention. A platen glass 10 is a transparent flat panel, on which a source document 1 having an image to be read is placed. Thus, the top surface of the platen glass 10 or the bottom surface of a source document 1 is a read-out face. Adjacent to the platen glass 10, a position-reading plate 11 with a position reading pattern being produced in or on the bottom face thereof is disposed over a range of vertical scanning. An optical image-forming system, which receives lights from the bottom surfaces of the source document 1 and position-reading plate 11 to form an image thereof, includes an illumination light source 21, mirrors 22 to 24, and lens 25. The illumination light source 21 emits an illumination light to illuminate the bottom surfaces of the source document 1 and the position-reading plate 11. The source document 1 and the position reading plate 11 illuminated by this illumination light emit scattered light, which is in turn reflected from the mirrors 22 to 24 sequentially and enters the lens 25 to be focused on a charge-coupled device (CCD) 30.

It is noted that in the above optical system, optical axes extending through the mirrors 22 and 23 and extending from the mirror 24 to the CCD sensor 30 are parallel to the platen glass 10 and parallel with each other. Needless to say, a direction along which each optical axis extends is a vertical scanning direction, and a direction perpendicular to the vertical scanning direction and parallel to the plane of the platen glass 10 is a horizontal scanning direction. The light source 21 for illumination and the mirror 22 are integrated into a full-rate carriage 26 so as to form a running assembly. The full-rate carriage 26 is driven or scanned in the vertical scanning direction at a rate of S. The mirrors 23 and 24 are integrated into a half-rate carriage 27 so as to form a running assembly. The half-rate carriage 27 is driven or scanned in vertical scanning direction at a rate of S/2. Therefore, although the full-rate carriage 26 and the half-rate carriage 27 are scanned, the optical image-forming system ranging from the source document 1 to the CCD sensor 30 is maintained substantially invariant.

In order to perform the function of detecting the light focused by the optical image-forming system, the CCD sensor 30 consists of a number of pixels arranged in line(s) parallel to the horizontal scanning direction so that the pixels are present in a plane, on which the light is focused by the optical image-forming system. Each pixel of the CCD sensor 30 is adapted to accumulate a charge corresponding in amount to a quantity of light received during a certain period of charge accumulation time and adapted to output the charge accumulated in each pixel as image data.

A scanner scans a image-reading line on the source document 1 through the above-mentioned optical image-forming system and CCD sensor 30. To this end, the scanner is formed so as to include a pulse motor 41, drive circuit 42, pulse-motor-control circuit 43, and motor-home-position detecting circuit 44. The drive circuit 42 energizes the pulse motor 41 for rotation to cause not only the full-rate carriage 26 to scan in the vertical scanning direction at the rate of S through a not shown rotation transmission mechanism (e.g., gears, belt and so on), but also the half-rate carriage 27 to scan in the horizontal scanning direction at the rate of S/2. The pulse-motor-control circuit 43 activates the pulse motor 41 for rotation through the drive circuit 42 based on information concerning the home position of the pulse motor 41 detected by the motor-home-position detecting circuit 44.

The charge accumulated in the CCD sensor 30 is read out sequentially by a readout means, which is composed of a timing circuit 51 and an analog-to-digital (A/D) converter circuit 52. The image data outputted from the CCD sensor 30 is inputted to the A/D converter circuit 52 in the form of analog values. The A/D converter circuit 52 converts the analog values to the corresponding digital values and outputs the latter. The timing circuit 51 outputs signals, that is, a line synchronous signal φTG and a pixel data transfer clock signal φCLK, which provide timing of reading out the charge accumulated in the CCD sensor 30. Further, the timing circuit 51 outputs an A/D timing signal ADCLK providing timing at which the A/D converter circuit 52 begins the conversion. The timing circuit 51 also outputs the line synchronous signalφTG and the A/D timing signal ADCLK to a correction circuit 100.

It is noted that the line synchronous signalφTG is a pulse signal produced at a fixed interval. The pixel data transfer clock signal φCLK is a signal consisting of pulses, of which number produced during a period of time from the trailing edge of the line synchronous signalφTG pulse to the leading edge of the next pulse is equal to the number of pixels of the CCD sensor 30. Each pixel of the CCD sensor 30 accumulates an amount of charge in response to a quantity of light, which is received by the associated pixel during the period of time from the trailing edge of the line synchronous signalφTG pulse to the leading edge of the next pulse, i.e., for the duration of the accumulation of charge. The charge accumulated in each pixel is successively outputted at the time of the leading edge of each pixel data transfer clock signal φCLK pulse. Furthermore, the A/D timing signal ADCLK is a pulse signal generated in synchronous with the pixel data transfer clock signal φCLK pulse.

A scanning position detector, which detects a scanning position of the aforementioned scanner or a position of a line along which the image on the source document 1 is scanned, is composed of the position reading plate 11 with the position-reading pattern being formed in the bottom surface thereof, the aforementioned optical image-forming system, and the CCD sensor 30. The correction circuit 100 corrects, based on the scanning position detected by the scanning position detector, the image data read from the CCD sensor 30. Regarding the correction, details thereof will be explained hereinafter.

Figure 2A:
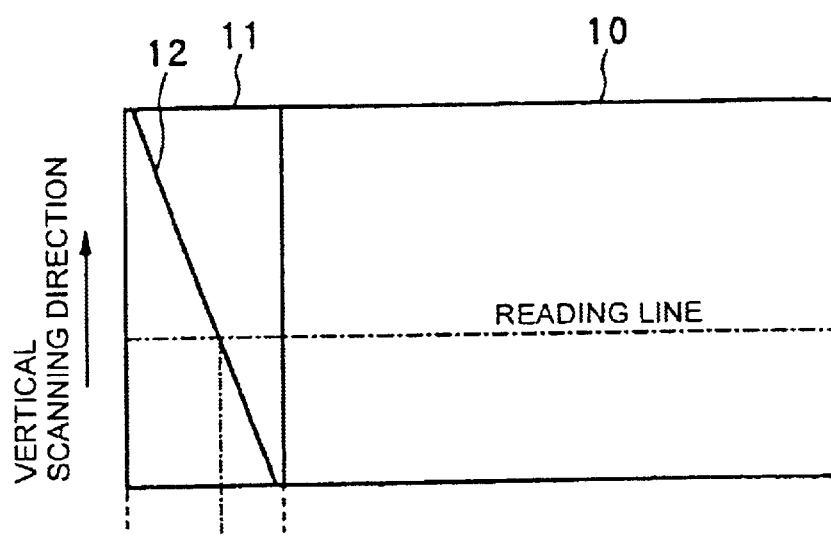
FIGS. 2A to 2C are diagrammatic views explaining operations of an optical image-forming system, CCD sensor and scanning-position detector of the image reading device according to the preferred embodiment.
Figure 2B:
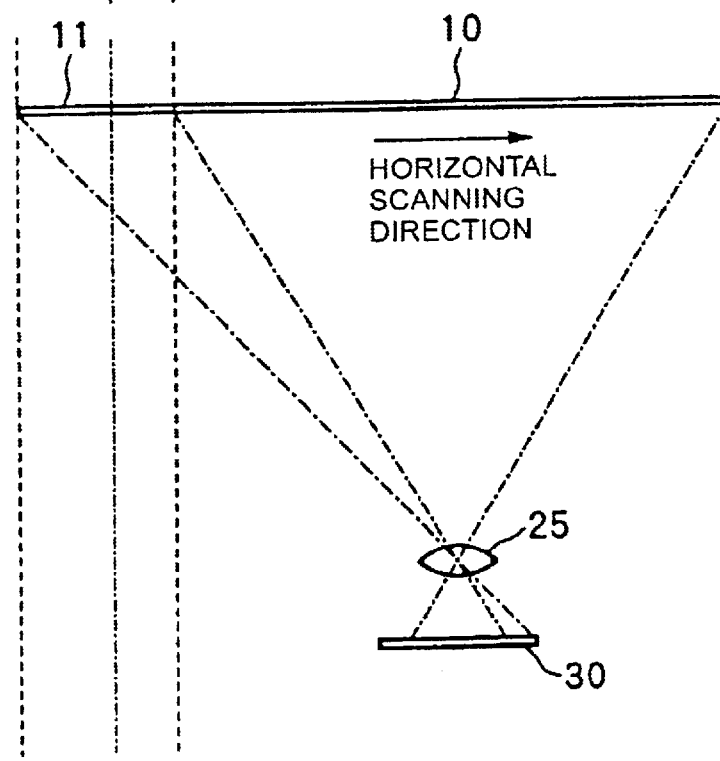
Figure 2C:
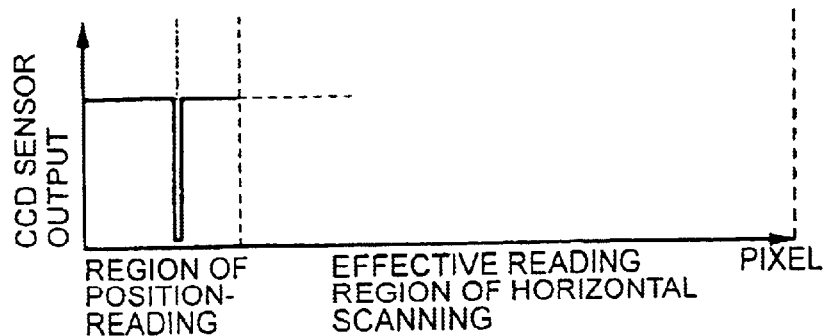

FIGS. 2A to 2C are views for explaining, respectively, the optical image-forming system, CCD sensor 30, and scanning position detector in the image reading device according to the preferred embodiment. FIG. 2A shows the platen glass 10 and the position reading plate 11 as viewed from below and FIG. 2B shows the same in the vertical scanning direction. As described above, because the optical path lengths between the lens 25 and the platen glass 10 and between the lens 25 and the CCD sensor 30 are always unchanged even when the full-rate and half-rate carriages 26 and 27 are scanning, the mirrors 22 to 24 among the optical image-forming system components are omitted in FIG. 2B for simplification, but the lens 25 is shown. FIG. 2C shows the image data outputted from the CCD sensor 30.

As shown in FIG. 2A, the position-reading plate 11 is the flat plate having the bottom surface, on or in which the position-reading pattern 12 is depicted over the range of vertical scanning. The position-reading pattern 12 depicted in or on the position-reading plate 11 is a straight line which is parallel to neither the horizontal direction nor the vertical direction. Also, as shown in FIG. 2B, the optical image-forming system for position-reading, which receives light from a portion of the position-reading pattern 12 on an extension of the reading line and forms an image of the received light, is common to the optical image-forming system receiving the light from the image depicted on the source document 1 placed on the platen glass 10 and forming the image of the received light.

Furthermore, among the pixels of the CCD sensor 30, pixels other than those for detecting the light from the image on the source document 1 may be utilized as a detector for detecting the image of light formed by the position-reading optical image-forming system or the aforementioned optical image-forming system and for detecting the scanning position of the scanner based on the detected image of light. In other word, the optical image-forming system forms the image of light from the image portion depicted on the source document 1 on the reading line and the image of light from the portion of the position-reading pattern 12 on the extension of the reading line. Then, the CCD sensor 30 detects these images of lights by the different pixels.

As will be understood from FIG. 2C, the image data outputted from the CCD sensor 30 changes in response to inconsistencies in density of light from the portion of the position-reading pattern 12 with respect to a region of pixels (position-reading region) that detected the image of light from the portion of the position reading pattern 12 on the extension of the reading line. However, with respect to a region of pixels (effective-position-reading region of the horizontal scanning) that detected the image of light from the image portion on the source document 1 on the reading line, the image data outputted from the CCD sensor 30 changes in response to inconsistencies in density of the image on the source document 1. As explained above, the position-reading pattern 12 is parallel to neither the horizontal scanning direction nor the vertical scanning direction. Therefore, if a position of pixel(s) of the CCD sensor 30, which outputted the pixel data having a minimum value (i.e., maximum density) among the image data of the position-reading region, is determined, the scanning position of the scanner can be obtained based on the above position of pixel(s) of the CCD sensor 30.

Figure 3:
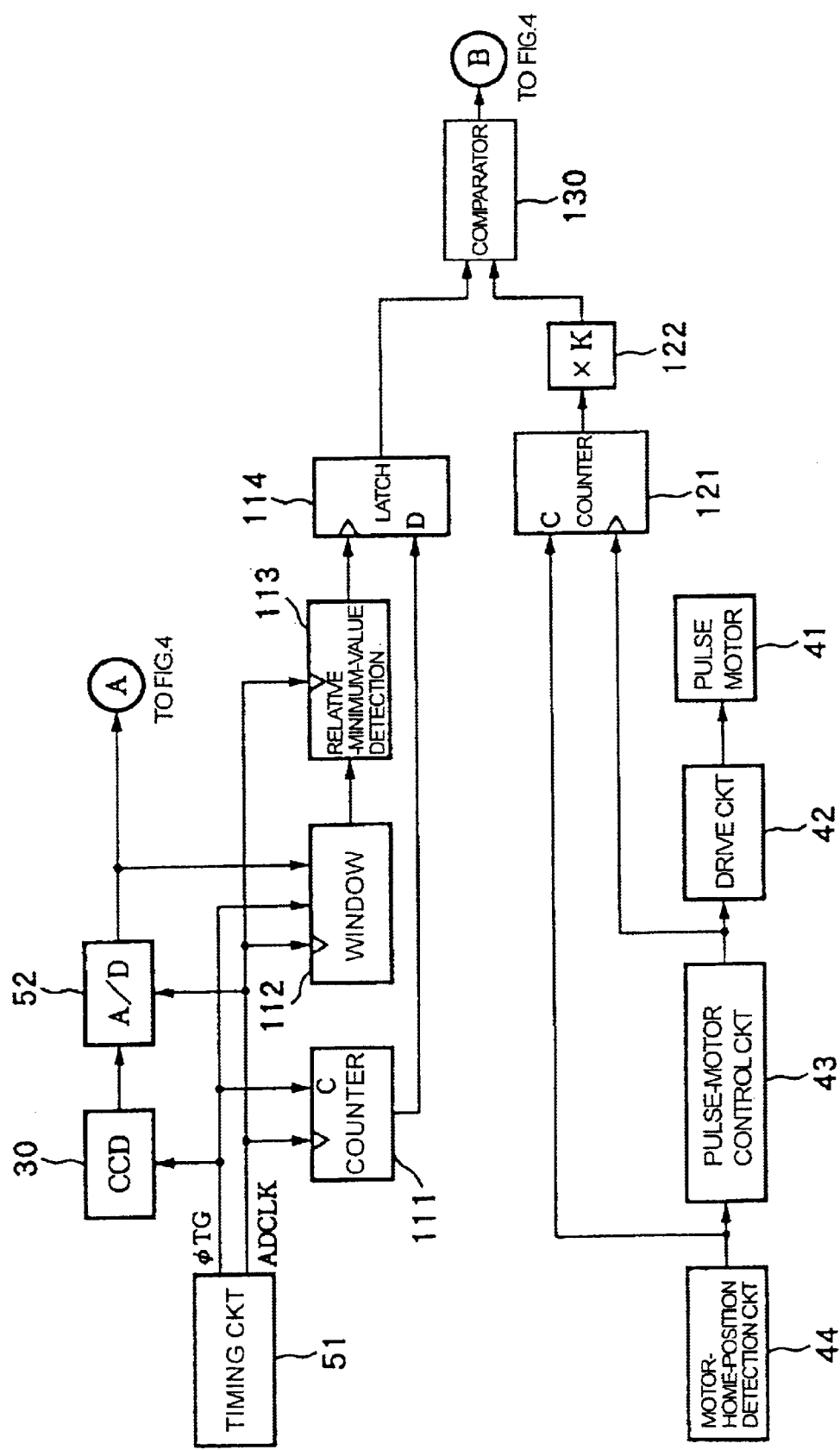
FIG. 3 is a view partially showing a correction circuit configuration of the image reading device in cooperation with FIG. 4.
Figure 4:
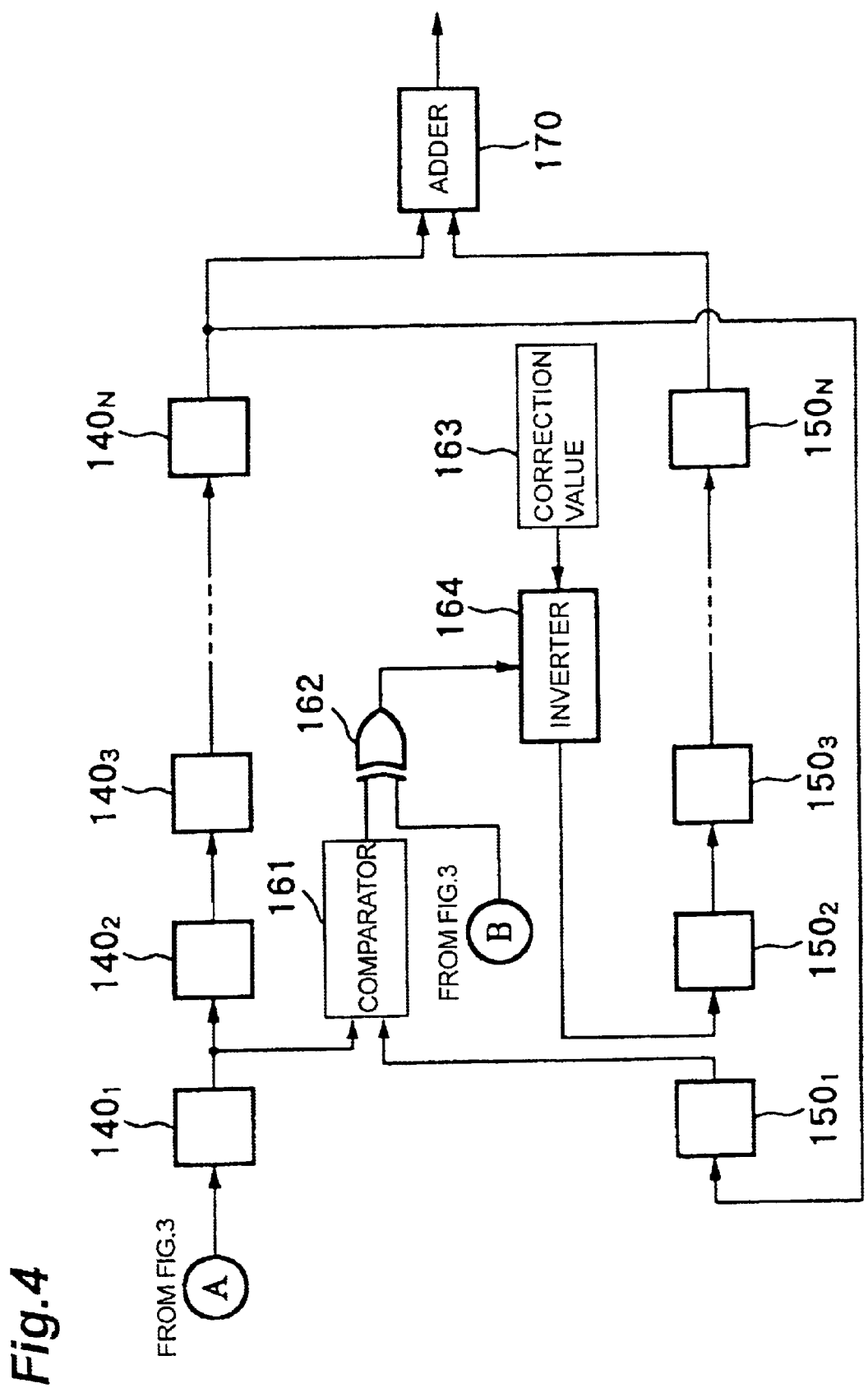
FIG. 4 is a view partially showing the correction circuit configuration of the image reading device in cooperation with FIG. 3.

The correction circuit 100 will be described in detail in conjunction with FIGS. 3 and 4, which illustrate the configuration of the correction circuit 100 in the image reading device according to the preferred embodiment. It is to be noted that in FIG. 3, in addition to elements forming the correction circuit 100, there are depicted various elements or circuits such as the aforementioned CCD sensor 30, timing circuit 51, A/D converter circuit 52, pulse motor 41, drive circuit 42, pulse-motor-control circuit 43 and motor-home-position detection circuit 44. The correction circuit 100 is composed of a counter circuit 111, window circuit 112, relative-minimum-value detection circuit 113, latch circuit 114, counter circuit 121, multiplier 122, comparator 130, resistor circuits $140_1$ to $140_N$ and $150_1$ to $150_N$, comparator 161, exclusive OR circuit 162, correction-value memory circuit 163, inverter circuit 164, and adder 170.

The counter circuit 111 receives the line synchronous signal φTG and A/D timing signal ADCLK outputted from the timing circuit 51. The counter circuit 111 clears a count value to zero at the leading edge of the line synchronous signal φTG and increases the count value by "1" at the leading edge of the A/D timing signal ADCLK and outputs the increased count value. The window circuit 112 receives not only the line synchronous signal φTG and A/D timing signal ADCLK outputted from the timing circuit 51, but also the image data outputted from the A/D converter circuit 52. Among the image data outputted from the A/D converter circuit 52, image data falling within the position-reading region is outputted from the window circuit 112 in synchronism with the A/D timing signal ADCLK during each duration between the trailing edge of each line synchronous signal φTG pulse and the leading edge of the next line synchronous signal φTG pulse.

The relative-minimum-value detection circuit 113 receives the A/D timing signal ADCLK outputted from the timing circuit 51 and the image data within the position-reading region outputted from the window circuit 112. The detection circuit 113 then detects pixel data having a minimum value among the image data within the position-reading region, in synchronism with the A/D timing signal ADCLK, and outputs a pulse signal representative of timing at which the pixel data having the minimum value was detected. The latch circuit 114 receives the count value signal outputted from the counter circuit 111, together with the pulse signal outputted from the detection circuit 113, and holds the count value signal outputted from the counter circuit 111 at the time when the pulse signal is inputted into the latch circuit 114. The count value is then outputted as hereinafter explained. The count value held by and outputted from the latch circuit 114 represents a position of pixel in the CCD sensor 30, which outputs pixel data having a minimum value (i.e., maximum density) among the image data within the position-reading region.

The counter circuit 121 receives the home-position detection signal indicating timing at which the motor-homeposition detection circuit 44 detected the home position of the pulse motor 41 as well as the drive pulse signal outputted from the pulse-motor control circuit 43 to energize the pulse motor 41 through the drive circuit 42. The counter circuit 121 clears a count value at the leading edge of the home-position detection pulse signal and increases the count value by "1" at the leading edge of the drive pulse signal and outputs the increased count value. The multiplier 122 receives the count value outputted from the counter circuit 121 and multiplies the count value by a certain factor of K. The multiplied results are outputted as hereinafter explained.

The comparator 130 receives the count value held by and outputted from the latch circuit 114 and the value of the multiplication results outputted from the multiplier 122 and compares them to find out which is higher. From the comparator 130, a logic signal is outputted based on the results of the comparison. The logic signal is a three-state or ternary signal indicating whether an actual scanning position of the scanner is in advance of, or late to, or coincident with an ideal scanning position. It is noted that the factor K in the multiplier 122 is set so that the multiplication results outputted from the multiplier 122 can be consistent with the count value held by and outputted from the latch circuit 114 when the actual scanning position of the scanner is coincident with the ideal scanning position.

Each of the register circuits $140_1$ to $140_N$ and $150_1$ to $150_N$ is a parallel register capable of holding each pixel data in the image data and operable in synchronism with the leading edge of the A/D timing signal ADCLK pulse outputted from the timing circuit 51. The N+1 register circuits $140_1$ to $140_N$ and $150_1$ are interconnected in series in ascending order of reference number. The N−1 register circuits $150_2$ to $150_N$ are also cascaded in ascending order of reference number. It is noted that an integer N is the number of pixels of the CCD sensor 30. The N+1 register circuits $140_1$ to $140_N$ and $150_1$ successively shift each pixel data in the image date outputted from the A/D converter circuit 52 in synchronism with the A/D timing signal ADCLK. Therefore, the pixel data outputted from the register circuits $140_1$ and $150_1$ represents density information of two positions identical to each other with respect to the horizontal scanning direction and different from each other by one step with respect to the vertical scanning direction.

The comparator 161 receives the pixel data outputted from either of the register circuits $140_1$ and $150_1$ and compares them to find out which is higher. From the comparator 161, a logic signal is outputted based on the results of the comparison between the pixel data regarding two positions different by one step from each other with respect to the vertical scanning direction. This logic signal is also a three-state or ternary signal indicating whether a gradient of density with respect to the vertical scanning direction is on an upward trend, or on a downward trend, or substantially constant with no fluctuations in gradient.

The exclusive OR circuit 162 receives the logic signal outputted from each of the comparators 130 and 161 and outputs a logic signal that is dependent on varying combinations of relations between the actual and ideal scanning positions and the density gradients with respect to the vertical scanning direction. The outputted logic signal is also a three-state signal. The correction-value memory circuit 163 stores therein a fixed value α. The inverter circuit 164 receives the logic signal outputted from the exclusive OR circuit 162 and the fixed value a stored in the correction-value memory circuit 163 and outputs any value selected from +α, −α and 0 based on the value of the logic signal.

More specifically, as will be understood from FIG. 5, assuming that a density gradient represented by the logic signal outputted from the comparator 161 is downward (−) and that misregistration in scanning position represented by the logic signal outputted from the comparator 130 is negative (−), the exclusive OR circuit 162 outputs a negative logic signal, and the inverter circuit 164 outputs −α as a correction value. In case where a density gradient is positive (+) and misregistration in scanning position is positive (+), the exclusive OR circuit 162 also outputs a negative logic signal, and the inverter circuit 164 outputs −α as a correction value. In either of the cases that a density gradient is negative (−) and misregistration in scanning position is positive (+) and that a density gradient is positive (+) and misregistration in scanning position is negative (−), the exclusive OR circuit 162 outputs a positive logic signal, and the inverter circuit 164 outputs +α as a correction value. When a density gradient is zero (0) or when misregistration in scanning position is zero (0), the exclusive OR circuit 162 outputs a "0" logic signal, and the inverter circuit 164 outputs "0" as a correction value.

Each of the N−1 register circuits $150_2$ to $150_N$ successively shift the correction value outputted from the inverter circuit 164 in synchronism with the A/D timing signal ADCLK. The adder 170 receives the image data outputted from the register circuit $140_N$ and the correction value outputted from the register circuit $150_N$ to add them together. The results of the addition are outputted therefrom. The image data of the above summation results outputted from the adder 170 is data for each pixel corrected in accordance with the misregistration in the scanning position of the scanner. The image data outputted from the adder 170 can be printed or displayed through a not shown output unit after being image processed by an image processing circuit if desired.

Figure 6:
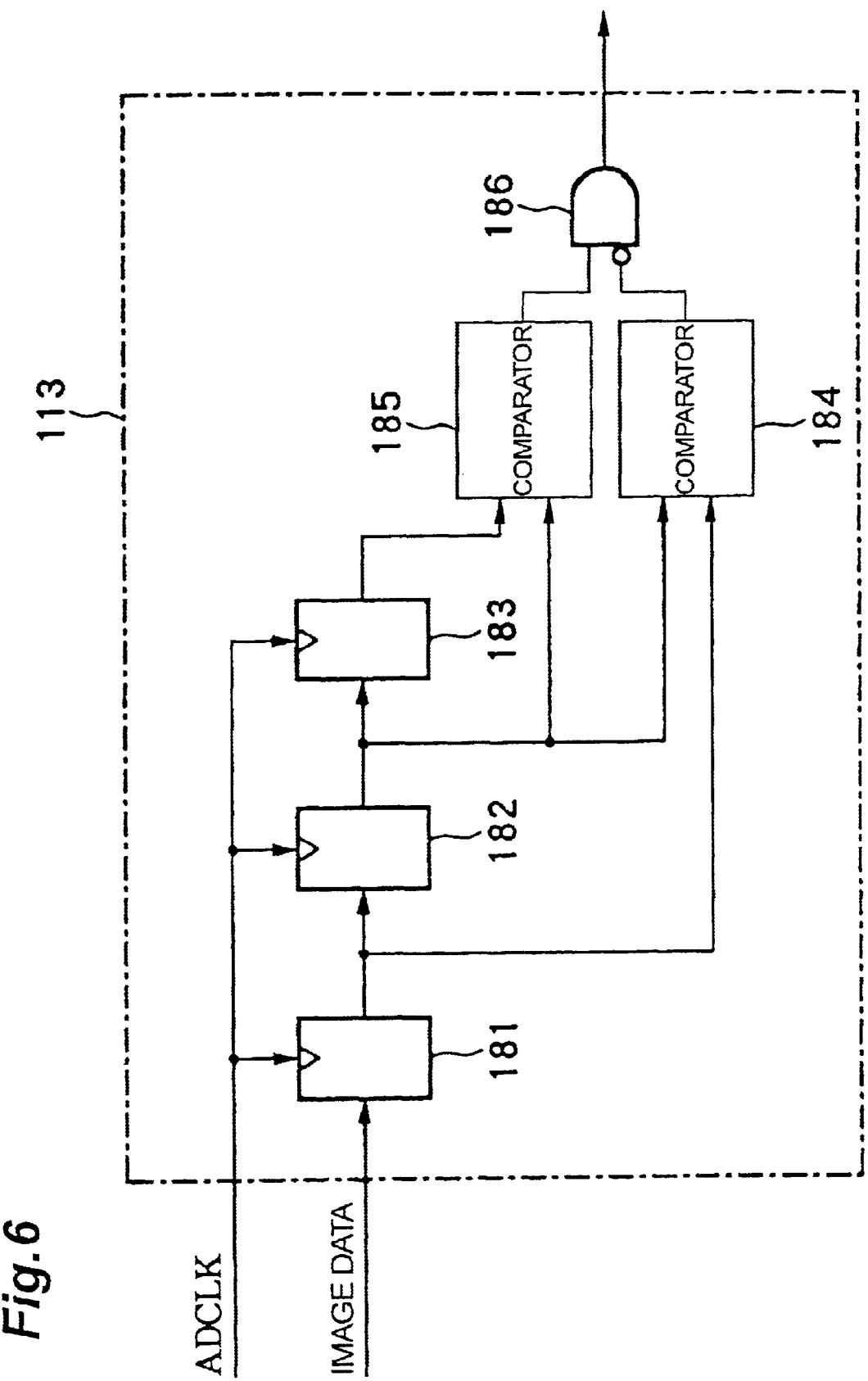
FIG. 6 is a view showing a configuration of a relative-minimum-value detecting circuit in the correction circuit of the image reading device according to the preferred embodiment.

FIG. 6 shows a configuration of the relative-minimum-value detection circuit 113 in the correction circuit of the image reading device according to the preferred embodiment. The relative-minimum-value detection circuit 113 is composed of register circuits 181 to 183, comparators 184 and 185, and an AND circuit 186. The register circuits 181 to 183 are cascaded in this order so that each pixel data in the image data outputted from the window circuit 112 is sequentially shifted in synchronism with the A/D timing signal ADCLK. The comparator 184 receives the pixel data outputted from each of the register circuits 181 and 182 and compares them to find out which is higher. The comparator 184 outputs a logic signal responsive to the results of the comparison. In a similar manner, the comparator 185 receives the pixel data outputted from each of the register circuits 182 and 183 and compares them to find out which is higher. The comparator 185 also outputs a logic signal responsive to the results of the comparison.

The AND circuit 186 receives an inverted signal regarding the logic signal outputted from the comparator 184, as well as the logic signal outputted from the comparator 185, and outputs a logic signal in accordance with these signals inputted into the AND circuit 186. The logic signal outputted from the AND circuit 186 is a signal indicating whether or not a pixel data value outputted from the register circuit 182 is larger than either of pixel data values outputted from the register circuits 181 and 183. In other words, it is a signal indicating timing at which a minimum pixel data value among the image data within the position reading region is detected.

Figure 7A:
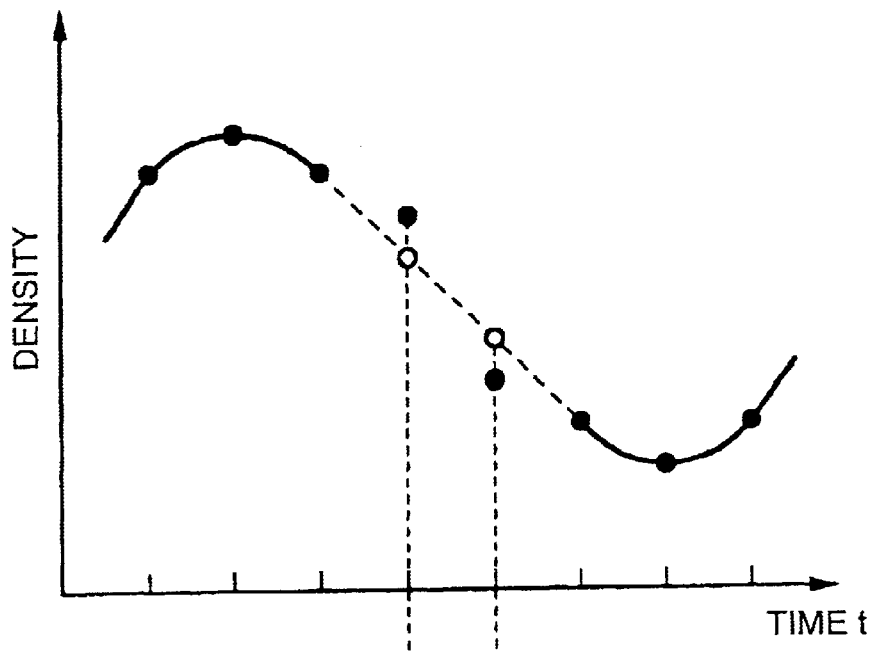
FIGS. 7A and 7B are graphs for explaining operations of the correction circuit of the image reading device according to the preferred embodiment.
Figure 7B:
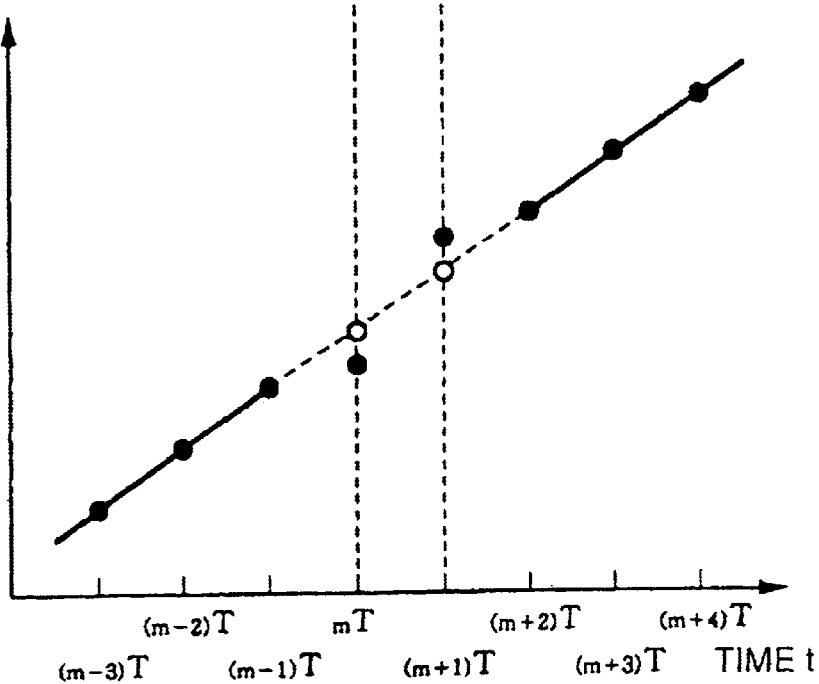

FIGS. 7A and 7B are views for explaining operations of the correction circuit 100 in the image reading device according to the preferred embodiment. In FIGS. 7A and 7B, the horizontal axis is a time-axis divided by tick marks labeled every cycle period of T of the line synchronous signal φTG, wherein m is an integer. FIG. 7A is a graph on which each density at positions having various coordinate values is plotted, the coordinate values of each position being unchanged with respect to the horizontal scanning direction and changed step by step with respect to the vertical scanning direction. A bullet illustrates density represented by each pixel data in the image data outputted from the A/D converter circuit 52 and a hollow circle illustrates density represented by each pixel data in the corrected image data outputted from the correction circuit 100. FIG. 7B shows a graph on which positions in the vertical scanning direction are plotted and in which a bullet shows an actual scanning position represented by the count value held by and outputted from the latch circuit 114 and a hollow circle shows an ideal scanning position represented by the multiplication results outputted from the multiplier 122.

As will be understood from FIG. 7B, at the times t=(m−3)T, (m−2)T, (m−1)T, (m+2)T, (m+3)T and (m+4)T, the actual scanning positions of the scanner are coincide with the corresponding ideal scanning positions, so that the image data is outputted without correction as shown in FIG. 7A. However, at the time of t=mT, because the actual scanning position of the scanner is minus with respect to the ideal scanning position as shown in FIG. 7B and the density gradient is minus as shown in FIG. 7A, the correction value −α is added to the pixel data by the correction circuit 100. Thus, the corrected pixel data is outputted. At the time of t=(m+1)T, because the actual scanning position of the scanner is plus with respect to the ideal scanning position as shown in FIG. 7B and the density gradient is minus as shown in FIG. 7A, the correction value +α is added to the pixel data by the correction circuit 100. Then, the corrected pixel data is outputted.

It is understood from the foregoing that with the image reading device according to the preferred embodiment, the optical image-forming system and the CCD sensor 30 are utilized to read not only the portion, which is over the reading line, of the image depicted on the source document 1 placed on the platen glass 10, but also the portion, which is on the extension of the reading line, of the position-reading pattern 12 depicted on the position-reading plate 11. Based on the read portion, which is on the extension of the reading line, of the position-reading pattern 12, the potential misregistration of scanning position of the scanner is detected. Furthermore, based on the detected misregistration of scanning position and on the density gradient in the vertical scanning direction obtained from the image data outputted from the CCD sensor 30, an amount of correction can be determined so that each pixel data for the image data is so corrected.

Accordingly, the image can be read and the excellent image data can be outputted regardless of an unevenness of scanning rate and an occurrence of resonance phenomenon. As the CCD sensor 30 and the optical image-forming system for reading the image depicted on the source document 1 can be employed as the scanning-position detector for detecting the actual scanning position of the scanner, there is no need to employ an additional optical system. This prevents an image reading device from being upsized.

The present invention is not limited to the aforementioned embodiment and many modifications can be conceived. For example, the position reading pattern 12 is not limited to the single straight line and may be formed in a zigzag pattern, or in a pattern increasing in thickness along the vertical scanning direction. Where the CCD sensor 30 comprises three CCD line sensors corresponding, respectively, to red (R), green (G) and blue (B), the position reading pattern 12 may include patterns corresponding to R, G and B.

The scanning-position detector for detecting the actual scanning position of the scanner is not limited to that explained in detail with reference to the preferred embodiment and a system provided exclusive to a scanning-position detector may be employed separately from the CCD sensor 30 and the optical image-forming system for reading the image depicted on the source document 1.

Thus, it is understood from the foregoing that the light from the image on the document to be read is focused through the optical image-forming system and detected by the CCD sensor. The image-reading line of the CCD sensor 30 and the optical image-forming system is scanned in the vertical scanning direction by the scanner and the charge accumulated in the CCD sensor is read by the read-out part. The scanning position of the scanner is detected by the scanning-position detector and the image data read by the read-out part is corrected by the corrector based on the scanning position detected by the scanning-position detector.

Accordingly, even if an unevenness of scanning rate occurs and/or a resonance phenomenon occurs, excellent image data can be outputted regardless of the presence or absence of the unevenness of scanning rate and the occurrence of resonance phenomenon, as the image data read out from the CCD sensor by the read-out part is corrected by the correction circuit.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An image reading device comprising:
   a first optical image-forming system receiving light from a first image disposed on a readout surface, and forming a second image of the light received on an image-forming plane;
   a charge coupled device (CCD) sensor comprising pixels arranged in the image-forming plane, parallel to a horizontal scanning direction, to detect the second image formed by said first optical image-forming system, said CCD sensor accumulating, in each pixel, a charge in response to the light detected at the respective pixel;
   scanning means for scanning, in a vertical scanning direction, perpendicular to the horizontal scanning direction, respective horizontal lines of the first image, through said first optical image-forming system and said CCD sensor;
   readout means for reading out, as image data, the charge accumulated in each pixel of said CCD sensor for each horizontal line;
   scanning-position detecting means for detecting scanning position of said scanning means in the vertical scanning direction for each horizontal line; and
   means for correcting the image data of each horizontal line read out by said readout means, based on the scanning position detected by said scanning-position detecting means for each horizontal line, wherein
   said scanning-position detecting means comprises
      a position-reading plate having a position-reading pattern located adjacent to said readout surface within a range of horizontal scanning by said scanning means,
      a second optical image-forming system for position-reading, said second optical image-forming system receiving light from said position-reading pattern on an extension of the horizontal line and forming an image of said position-reading pattern, and means for detecting amount of light of the image of said position-reading pattern formed by said second optical image-forming system, said detecting means determining the scanning position scanned by said scanning means based on the amount of light detected, said first and second optical image-forming systems share optical elements, and said means for detecting includes pixels of said CCD sensor not used to detect the light forming the second image formed by said first optical image-forming system.

* * * * *